United States Patent [19]

Emory

[11] Patent Number: 5,438,789
[45] Date of Patent: Aug. 8, 1995

[54] FISHING ROD HOLDER ASSEMBLY

[75] Inventor: John E. Emory, Traverse City, Mich.

[73] Assignee: Big Jon, Inc., Traverse City, Mich.

[21] Appl. No.: 316,936

[22] Filed: Oct. 3, 1994

[51] Int. Cl.⁶ .......................................... A01K 97/10
[52] U.S. Cl. ................................ 43/21.2; 248/514; 248/515
[58] Field of Search ................... 43/21.2; D22/147; 248/514, 575, 516, 535, 538, 520

[56] References Cited

U.S. PATENT DOCUMENTS

| | | | |
|---|---|---|---|
| D. 332,299 | 1/1993 | Dryna et al. | D22/147 |
| 684,451 | 10/1901 | Mowry | 248/514 X |
| 2,692,106 | 10/1954 | Hermann | 248/514 |
| 4,157,803 | 6/1979 | Mack | 248/512 |
| 4,209,098 | 6/1980 | Adams | 211/60 R |
| 4,485,579 | 12/1984 | Hawie | 43/21.2 |
| 4,495,721 | 1/1985 | Emory, Jr. | 43/21.2 |
| 4,527,349 | 7/1985 | Emory, Jr. | 43/21.2 |
| 4,852,291 | 8/1989 | Mengo | 43/21.2 |
| 4,869,195 | 9/1989 | Eichfeld | 114/364 |
| 5,142,809 | 9/1992 | O'Brien et al. | 43/21.2 |
| 5,163,652 | 11/1992 | King | 248/538 |
| 5,367,815 | 11/1994 | Liou | 43/21.2 |

Primary Examiner—Mark Rosenbaum
Assistant Examiner—Jeanne M. Elpel
Attorney, Agent, or Firm—Price, Heneveld, Cooper, DeWitt & Litton

[57] ABSTRACT

A fishing rod holder assembly includes a channel, a bracket, a hub and a rod holder. The channel may be mounted on the boat at any angle desired, from horizontal to vertical. The bracket is configured to be slidably inserted within the channel in any of four orientations. The hub, which is rotatably mounted on the bracket, defines a plurality of apertures. A pin is positioned on the bracket. A spring biases the hub against the bracket to a positive, locked position with the pin in one of the apertures. Separate tile pieces, configured to be slidably inserted within the channel, space rod holders on the channel.

17 Claims, 2 Drawing Sheets

FISHING ROD HOLDER ASSEMBLY

BACKGROUND OF THE INVENTION

The present invention relates to fishing rod holders and more particularly to an improved holder assembly which is securable to a boat and adjustably supports a fishing pole at various angles of inclination.

Heretofore, a fairly wide variety of supports or rod holders have been proposed. Ordinarily, such holders may be clamped to the gunwale of a boat and support a single fishing rod. These assemblies, once mounted at the desired location on a boat, may permit the angle of inclination of the rod to be varied, but only in a single plane. For example, U.S. Pat. No. 684,451 entitled POLE-SUPPORT, which issued on Oct. 15, 1901, to Mowry, discloses a pole holder which utilizes a ball-and-socket joint to allow the angle of inclination of the pole to be varied. This is accomplished by the movement of a bolt through a slot in the ball mechanism. As such, when the pole holder is mounted to, e.g., a boat, the angle of the rod can be adjusted in a 180° arc, but only in a plane corresponding to the direction of the slot. Should a fisherman desire to position his rod in a different plane, the pole holder would have to be completely dismantled from the boat and reattached in the new position. This burdensome procedure would not only be time-consuming, but also would leave unsightly holes on the boat from prior mounting positions. Another example is U.S. Pat. No. 2,692,106 entitled FISHING ROD HOLDER, issued on Oct. 19, 1954, to Herrmann, which discloses a rod holder that is rotatably adjustable. However, the rod holder is designed to be mounted to the upstanding sidewall of a boat, particularly to the gunwale, and, as such, provides for movement only about a substantially horizontal axis in a plane disposed longitudinally of the boat. U.S. Pat. No. 5,163,652 entitled CLAMP AND ROD HOLDER ASSEMBLY, which issued on Nov. 17, 1992, to King, does provide a rod holder having a greater degree of adjustability. However, the rod holder is attached to a boat by means of a clamping device that allows for mounting only in select locations on a boat, such as on top of the gunwale.

Fishing rod holders have been developed which allow for the mounting of multiple fishing rods. For instance, U.S. Pat. No. 4,485,559 entitled ROD HOLDER AND ALIGNMENT DEVICE, which issued on Dec. 4, 1984, to Hawie, discloses a multi-rod holder which is mounted within a conventional rod holder on a boat. The rods are held in a fixed, upright position, there being no provision for rotatably adjusting the angle of inclination of the rod. Other multi-rod holders have been proposed which typically involve one or more elongated members having a plurality of longitudinally spaced rod holder apertures and which usually extend transversely across the boat from gunwale to gunwale. Examples of such may be found in U.S. Pat. No. 4,157,803 entitled FISHING ROD HOLDER, which issued on Jun. 12, 1979, to Mack; U.S. Pat. No. 4,527,349 entitled TROLLING BAR ASSEMBLY, which issued on Jul. 9, 1985, to Emory, Jr.; and U.S. Pat. No. 4,869,195 entitled FISHING POLE MOUNTING DEVICE FOR A BOAT, which issued on Sep. 26, 1989, to Eichfeld. Such holders, while again failing to provide for adjustment of the rod's angle of inclination, can also be potentially cumbersome due to their elongated nature and their extension across the width of the boat.

An assembly has been shown which uses a combination of a rod holder and a channel mount. U.S. Design Pat. No. 332,299 entitled COMBINED FISHING ROD HOLDER AND TROLLING BOARD, which issued on Jan. 6, 1993, to Dryna et al., discloses a rod holder slidably mounted within a channel-shaped trolling bar or board. Structure is provided which permits adjustment of the rod's angle of inclination in a single vertical plane.

A need exists for a fishing rod holder assembly which is adaptable to mount a plurality of fishing rods, which can be securely mounted on a boat at any desired angle, from horizontal to vertical, and which provides fixed positioning of the rod holder at different angles of inclination on the boat.

SUMMARY OF THE INVENTION

In accordance with the present invention, a fishing rod holder assembly is provided by which the aforementioned needs are met. Essentially, the assembly includes a channel, which may be mounted to a boat in almost any location and at any desired angle, from horizontal to vertical. The individual rod holders are each pivotally mounted on a bracket. The bracket is configured to slide into the channel and may be inserted in any of four positions. When positioned within the channel, the individual base of each rod holder is secured in position by a set screw which is carried by the bracket. This permits quick and easy removal of the rod holder from the channel, such as, when a different configuration is desired.

The bracket includes a base and a mounting flange with a locking pin attached to the mounting flange. A hub is pivotally attached to the mounting flange with a rod holder being connected to the hub. The hub has a series of apertures therein, which selectively receive the lock pin. A spring resiliently biases the hub against the mounting flange to a positive, locked position with one of the hub apertures receiving the locking pin. Angular adjustment of the rod holder to various fixed positions in a 180° arc through a single plane of inclination is provided.

The fishing rod holder assembly of the present invention provides for variable angular inclination of the rod holder to various fixed positions in a plane disposed longitudinally of the boat. The plane of inclination can then be quickly and easily adjusted to be disposed latitudinally of the boat by loosening the set screw, sliding the bracket out of the channel, rotating the bracket 90°, and repositioning the bracket within the channel. The hub is adjustable to change the rod holder angle of inclination.

In narrower aspects of the invention, individual tile pieces are provided which are configured to be slidably inserted within the channel. The tile pieces serve to separate multiple rod holders spatially so as to prevent the fishing line of one rod from becoming entangled with that of another rod. More than one tile piece can be inserted to provide the desired distance between rods.

DETAILED DESCRIPTION OF THE PREFERRED EMBODIMENT

Figure 1:
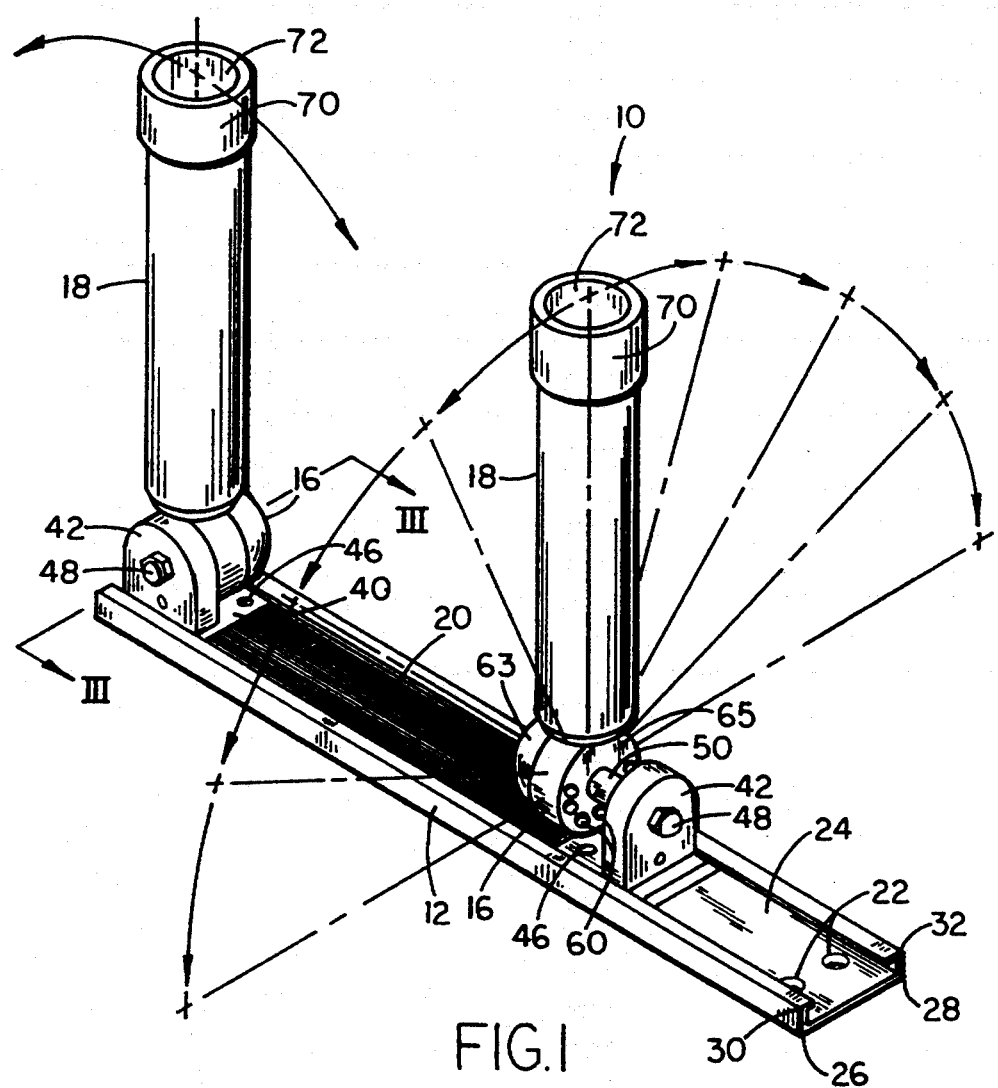
FIG. 1 is a perspective view of a fishing rod holder assembly in accordance with the present invention showing two rod holders and illustrating the angular adjustment of the rod holders.
Figure 2:
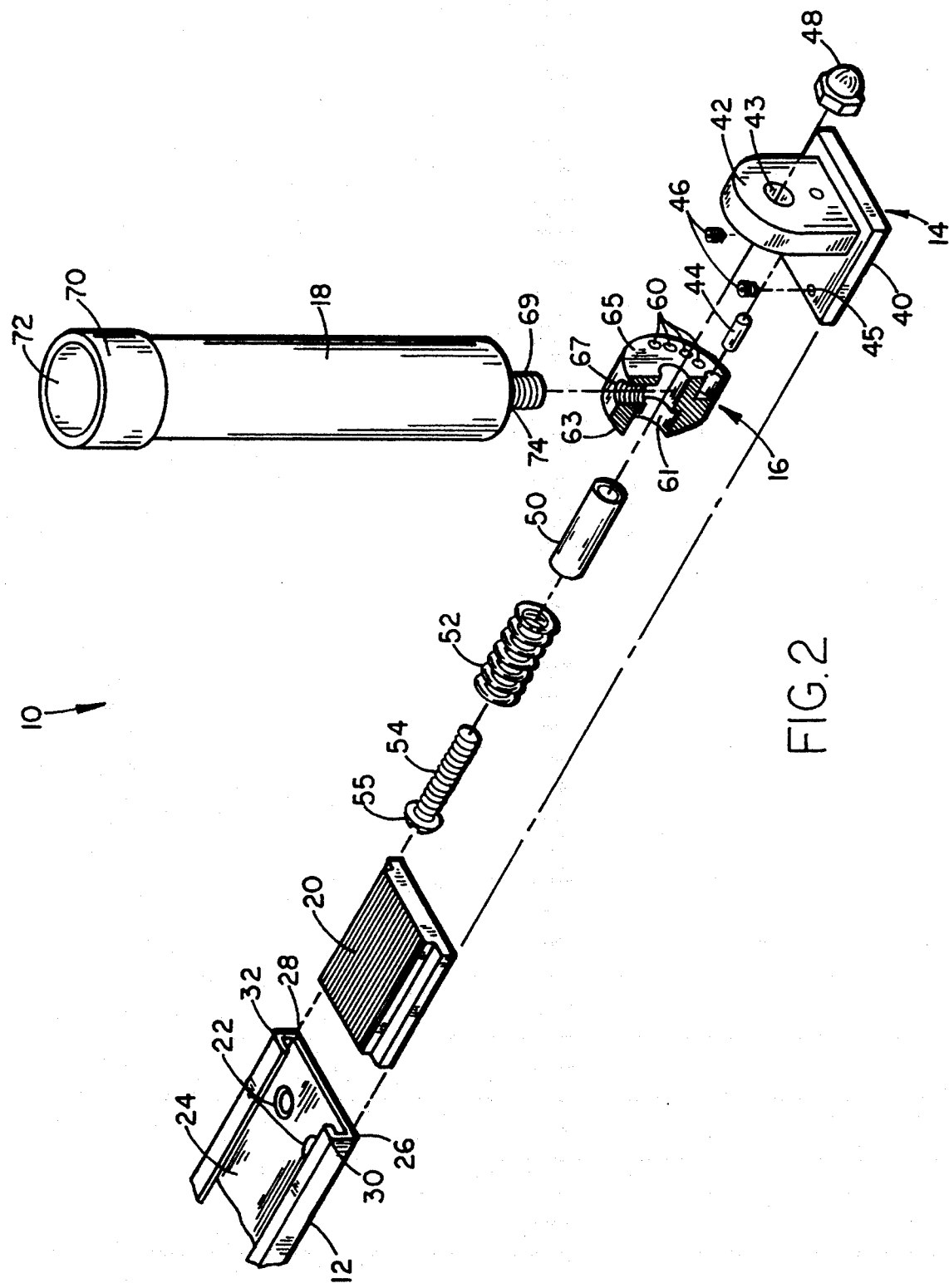
FIG. 2 is an exploded view of the rod holder assembly.

A preferred embodiment of a fishing rod holder assembly in accordance with the present invention is illustrated in FIGS. 1 and 2 and generally designated by the numeral 10. Assembly 10 includes a mounting channel 12, a bracket 14, a hub 16 and a rod holder 18. Rod holder assembly 10 is secured to a boat by channel 12. Channel 12 is adapted to be mounted to any suitable position on the boat, and at any angle desired, from horizontal to vertical, thus providing a great deal of flexibility with regard to the location of rod holder assembly 10. In the preferred embodiment, channel 12 is provided with a plurality of channel apertures 22, as shown in FIG. 1, allowing the rod holder assembly to be screw-mounted on the boat.

Figure 3:
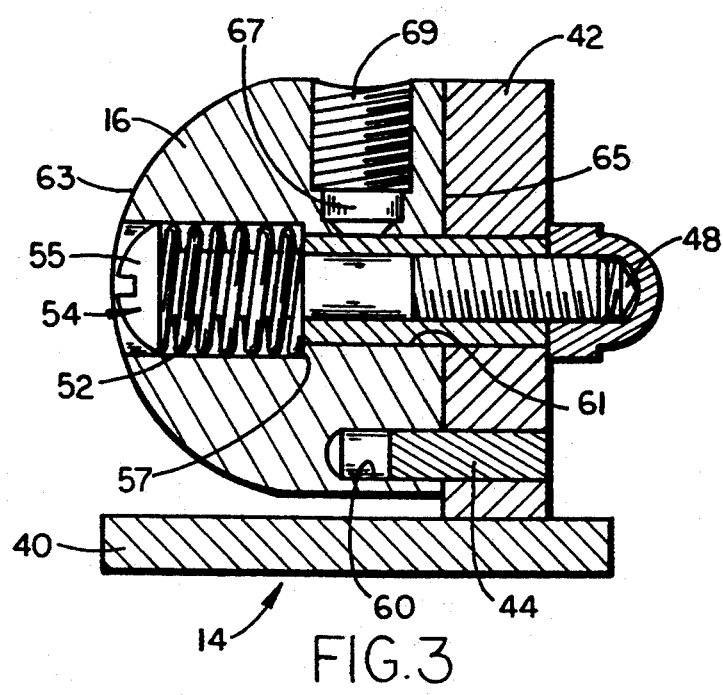
FIG. 3 is a cross-sectional view taken generally along line III—III of FIG. 1.

Channel 12, which is generally U-shaped in cross section, includes a base or plate 24, integral first and second sides 26, 28 and integral first and second lips 30, 32. As best seen in FIGS. 2 and 3, plate 24 is a generally flat, elongated member. First side 26 and second side 28 are perpendicular to plate 24 and parallel to each other. In a preferred embodiment, first and second lips 30, 32 extend perpendicularly from first and second sides 26, 28 and are parallel to plate 24. Channel 12 defines a longitudinally extending groove or slot.

As seen in FIG. 2, bracket 14 includes a base 40 and a mounting flange 42 extending from base 40. Mounting flange 42 is perpendicular to base 40. Base 40 is provided with one or more set-screw apertures 45, which carry one or more set screws 46. Base 40 is configured so that it may be slidably inserted within the groove or slot defined by channel 12. First lip 30 and second lip 32 capture base 40 within channel 12. Base 40 is square in shape and may be slidably inserted within channel 12 in any of four orientations. When so inserted, base 40 is secured in place by tightening set screw 46. If a different orientation of base 40 is desired, this can be quickly and easily accomplished by loosening set screw 46, sliding base 40 out of channel 12, rotating base 40 to the desired orientation, and repositioning base 40 within channel 12. This provides a simple and efficient method for reorienting base 40 without having to dismantle channel 12 and remount it on the boat in the desired orientation.

Mounting flange 42 defines a mounting aperture 43. A locking pin 44 is fixed to flange 42.

Rod holder 18 is secured to hub 16. Rod holder 18 is an elongated, cylindrical member open at one end 72 to receive a fishing rod. Holder 18 is closed at end 74. Rod holder 18 may be provided with a protective covering 70 of suitable plastic material, press-fitted or shrunk onto open end 72 of rod holder 18, to protect the handle of a fishing rod. Protective covering 70 extends internally of rod holder 18 to insure a snug fit between the fishing rod handle and rod holder 18. Rod holder 18 includes a threaded member 69, secured to opposite end 74 of rod holder 18, as shown in FIG. 2.

Hub 16 is attached to end 74 of rod holder 18. Hub 16 defines a threaded bore 67, such that rod holder 18 may be secured to hub 16 by threadably inserting threaded member 69 of rod holder 18 into threaded bore 67 of hub 16. Hub 16 has a first face 63 and a second face 65.

As shown in FIGS. 1 and 2, second face 65 defines a series of spaced, arcuately positioned hub apertures 60. Face 65 of hub 16 faces the outwardly extending locking pin 44 on mounting flange 42. Hub apertures 60 can be selectively aligned with locking pin 44. A spring 52 resiliently biases hub 16 toward flange 42.

Hub 16 defines a stepped through bore 61. Bore 61 is perpendicular to threaded bore 67 in hub 16 as shown in FIG. 2. An axle 50 is positioned within bore 61. Hub 16 is pivotally mounted to mounting flange 42 using a bolt 54 and nut 48. As indicated in FIG. 2, bolt 54 first passes through spring 52, then axle 50 within bore 61, and finally through mounting aperture 43. A nut 48 secures the bolt. Hub 16 is rotatably mounted on flange 42 by the axle and bolt combination. Spring 52 engages head 55 of bolt 54 and a shoulder 57 of stepped bore 61. Spring 52, therefore, resiliently biases hub 16 against flange 42. Hub 16 and rod holder 18 may be grasped and shifted to the left, when viewed in FIG. 3, against the bias of spring 52 and away from flange 42. Pin 44 is released from an aperture 60, and hub 16 may be rotated to a new position about axle 50. When pin 44 aligns with another aperture, spring 52 will hold the hub in a locked position.

Separate tile pieces 20 are provided which are configured to be slidably inserted within channel 12 and captured by first lip 30 and second lip 32, as shown in FIG. 1. Tile pieces 20 serve to spatially separate rod holders when more than one holder is used. This is often necessary to prevent the fishing line from one rod from becoming entangled with that of another rod. The tile piece 20 can be of any suitable length, and more than one tile piece 20 can be slidably inserted within channel 12 to provide the desired distance between rods.

In operation, channel 12 is mounted at a suitable location on a boat, at whatever angle is desired, from horizontal to vertical. Bracket 14, with hub 16 and rod holder 18 pivotally attached thereto, is slidably inserted within channel 12 and held in place by tightening set screws 46. More than one assembly 10 can be mounted on channel 12. The assemblies are separated at desired distances by one or more tile pieces 20. Bracket 14 may be inserted into channel 12 in any of four possible orientations. Rod holder 18 may be set by hand to any desired angle of inclination, corresponding to the various hub apertures 60 on hub 16. The angle of inclination is changed by pulling hub 16 out of its positive, locked position away from mounting flange 42, rotating hub 16 to the desired angle, and releasing hub 16 to reengage locking pin 44. This allows for angular adjustment of rod holder 18 to various fixed positions within a 180° arc.

The above description should be considered as that of the preferred embodiment only. Modifications of the invention may occur to those skilled in the art and to those who make or use the invention. Therefore, it should be understood that the embodiment shown in the drawings and described above is merely for illustrative purposes and is not intended to limit the scope of the invention, which is defined by the following claims as interpreted according to the principles of patent law, including the Doctrine of Equivalents.

The embodiments of the invention in which an exclusive property or privilege is claimed are defined as follows:

1. A rod holder assembly, comprising:
a channel adapted to be mounted on a boat;

a bracket comprising a base and a mounting flange, said base being configured so as to permit said bracket to be slidably inserted within said channel;

a locking pin on said flange;

a rod holder having an open end adapted to receive a fishing rod;

a hub fixed to said rod holder opposite said open end, said hub being pivotally mounted to said mounting flange of said bracket and having a plurality of hub apertures therein; and a spring engaging said hub for resiliently biasing said hub against said mounting flange such that one of said hub apertures may be selectively aligned with said locking pin to lock the rod holder to said bracket and allow for angular adjustment of the rod holder to various fixed positions in a plane.

2. The rod holder assembly of claim 1, wherein said base is generally square-shaped, such that said bracket may be slidably inserted within said channel in any of four possible configurations.

3. The rod holder assembly of claim 2, wherein said mounting flange is perpendicular to said base.

4. The rod holder assembly of claim 2, wherein said base has at least one set-screw aperture.

5. The rod holder assembly of claim 4, further comprising a set screw positioned within said set-screw aperture to secure said base to said channel when said bracket is slidably inserted within said channel.

6. The rod holder assembly of claim 5, wherein said mounting flange has a mounting aperture therein, said hub including a face having said hub apertures therein, said hub further defining a through bore opening through said face, said assembly further including an axle positioned within said bore, and a bolt extending through said axle and mounting said axle on said flange, said spring engaging said bolt and said hub.

7. The rod holder assembly of claim 6, wherein the rod holder is cylindrical in shape.

8. The rod holder assembly of claim 5, wherein said hub defines a threaded bore therein, said rod holder having a threaded member opposite its open end, said rod holder being threadably attached to said hub.

9. The rod holder of claim 5, further comprising one or more tile pieces, configured to be slidably inserted within said channel to separate a plurality of holder assembly brackets mounted on said channel.

10. A rod holder assembly comprising:
a bracket adapted to be mounted on a boat;
a locking pin fixed to said bracket;
a rod holder;
a hub attached to said rod holder defining a plurality of hub apertures;
a shaft rotatably mounting said hub on said bracket; and
a spring engaging said hub for resiliently biasing said hub into engagement with said bracket with said pin disposed in one of said apertures.

11. The rod holder assembly of claim 10, further comprising a channel adapted to be mounted on a boat, said bracket being received by said channel.

12. The rod holder assembly of claim 10, wherein the channel includes a plate, a first side and a second side extending from said plate, said first side and said second side being configured to define a longitudinally extending slot which serves to capture said bracket when it is slidably inserted within said channel.

13. The rod holder assembly of claim 12, wherein said channel further comprises a first lip extending from said first side and a second lip extending from said second side.

14. The rod holder assembly of claim 13, wherein said first and second sides are perpendicular to said plate and parallel to each other, said first lip is perpendicular to said first side and parallel to said plate, and said second lip is perpendicular to said second side and parallel to said plate.

15. The rod holder assembly of claim 12, wherein the plate defines a plurality of channel apertures.

16. The rod holder assembly of claim 11, further comprising a plurality of tile pieces, each tile piece configured to be slidably inserted within said channel so that when more than one rod holder bracket is inserted into said channel, said brackets can be spatially separated by one or more tile pieces.

17. A rod holder assembly comprising:
a bracket comprising a base and a mounting flange, said mounting flange having a locking pin fixed thereto;
a rod holder having an open end adapted to receive a fishing rod;
a hub fixed to said rod holder opposite said open end, said hub being pivotally mounted to said mounting flange of said bracket and further defining a plurality of hub apertures; and
a spring engaging said hub and resiliently biasing said hub against said mounting flange such that said hub apertures may be selectively aligned with said locking pin to form a positive lock, allowing for angular adjustment of the rod holder to various fixed positions in a plane.

* * * * *